United States Patent
Molisimo et al.

(10) Patent No.: US 9,361,501 B2
(45) Date of Patent: Jun. 7, 2016

(54) HEADHELD SCANNER AND POS DISPLAY WITH MOBILE PHONE

(71) Applicants: Brian G. Molisimo, Cagayan de Oro (PH); John Paul Opay, Cebu (PH); Jeffrey Yap, Cebu (PH)

(72) Inventors: Brian G. Molisimo, Cagayan de Oro (PH); John Paul Opay, Cebu (PH); Jeffrey Yap, Cebu (PH)

(73) Assignee: NCR Corporation, Duluth, GA (US)

( * ) Notice: Subject to any disclaimer, the term of this patent is extended or adjusted under 35 U.S.C. 154(b) by 110 days.

(21) Appl. No.: 13/854,211

(22) Filed: Apr. 1, 2013

(65) Prior Publication Data
US 2014/0291396 A1  Oct. 2, 2014

(51) Int. Cl.
| G06K 7/10 | (2006.01) |
| G06K 7/14 | (2006.01) |
| G02B 27/01 | (2006.01) |
| G07G 1/00 | (2006.01) |
| G06F 1/16 | (2006.01) |

(52) U.S. Cl.
CPC .............. *G06K 7/1447* (2013.01); *G02B 27/01* (2013.01); *G02B 27/017* (2013.01); *G06F 1/163* (2013.01); *G06K 7/109* (2013.01); *G06K 7/10881* (2013.01); *G07G 1/00* (2013.01); *G02B 2027/014* (2013.01); *G02B 2027/0138* (2013.01)

(58) Field of Classification Search
USPC ............. 235/383; 359/618; 345/8; 705/14.58
See application file for complete search history.

(56) References Cited

U.S. PATENT DOCUMENTS

| 6,349,001 | B1 * | 2/2002 | Spitzer | 359/618 |
| 8,660,293 | B2 * | 2/2014 | Sako et al. | 382/100 |
| 2006/0244677 | A1 * | 11/2006 | Dempski | 345/8 |
| 2012/0235883 | A1 * | 9/2012 | Border et al. | 345/8 |
| 2012/0262558 | A1 * | 10/2012 | Boger et al. | 348/61 |
| 2013/0278631 | A1 * | 10/2013 | Border et al. | 345/633 |
| 2015/0073907 | A1 * | 3/2015 | Purves | G06Q 20/32 705/14.58 |

* cited by examiner

*Primary Examiner* — Daniel Hess
(74) *Attorney, Agent, or Firm* — Peter H. Priest; Schwegman, Lundberg & Woessner

(57) ABSTRACT

Headheld scanners are described for use by cashiers in connection with customer checkout at grocery, retail or other stores, as well as, headheld scanners for use by customers to augment the shopping experience. Such headheld scanners will typically include a camera, display and mobile phone, including a microphone and speaker to recognize voice commands and provide audible responses, as well as, calling others. A projector may be employed to project virtual peripherals at checkout, such as a virtual keyboard or scale display.

20 Claims, 8 Drawing Sheets

HEADHELD SCANNER AND POS DISPLAY WITH MOBILE PHONE

FIELD OF THE INVENTION

The present invention addresses improvements applicable to checkout, and customer service processes and systems applicable to contexts, such as grocery, retail, and the like. More particularly, the present invention addresses aspects of a headheld scanner and point of sale (POS) display and processes of employing same, as well as, aspects of a headheld scanner for customer service and support.

BACKGROUND OF THE INVENTION

In a typical assisted checkout environment, such as that found in a grocery store, a cashier stands at a checkstand including a point of sale terminal with a large touchscreen display. A conveyor is employed upon which products are placed and then advanced for scanning or weighing on an integrated barcode scanner and scale, and a further conveyor is employed which conveys scanned and weighed products to a bagging area. In another typical arrangement, such as a drugstore or convenience store, a customer places a basket of items on a countertop. A store employee stands behind a POS terminal on the opposite side of the counter from the customer, scans items with a headheld scanner, takes the customer's payment by credit card or cash, and provides the customer with a printed receipt. Self-checkout systems similarly tend to be large, bulky, and complex systems.

Such arrangements, while having many advantages, tend to include multiple, bulky and separate components, such as a large touch screen display, a barcode scanner/scale, a keyboard, a mouse, as well as, network communications support such as a phone line for credit card sales approval, and the like. Additionally, various tasks performed utilizing such systems may require the store person performing the checkout function to look away from the customer thereby diminishing the checkout experience or preventing the cashier from observing customer activities, such as attempted shoplifting or the like.

SUMMARY OF THE INVENTION

In one aspect, the present invention addresses an integrated headheld scanner and display (headheld scanner) which, when adopted for cashier use, combines a barcode scanner, POS display, mobile phone and other peripherals worn on the head of a cashier or other store service person. In one embodiment, an image engine, projector, mobile phone and micro display are integrated in one head gear. As a result, a standard touch screen PC monitor, barcode scanner, phone and other peripherals seen at the typical cashier's checkstand can be eliminated since they are now provided in a single device having the approximate size of standard eyewear. The headheld scanner communicates with a store server or PC terminal at the checkout stand wirelessly if worn or in a wired connection if docked for charging or for use in a docked configuration.

Thus, an aspect of the invention seeks to lessen the number of separate components, such as the display, barcode scanner, keyboard and mouse, and phone connections found in a typical checkstand. The bulk of these items can consume a lot of valuable retail space. Also, such equipment is expensive to manufacture considering the components and raw materials used. Further, with the conventional display, the cashier turns away from the display while scanning items and cannot closely monitor if there are discrepancies or system errors, as the display updates during scanning. Alternatively, while focused on the display, the cashier's focus is diverted from the customer and the checkout line.

Among its several aspects, the present invention provides a compact system that only requires a few square inches on the checkstand for docking. Some peripherals, such as a keyboard or scale display, are advantageously electronically generated as needed. With the cashier wearing the headheld scanner and POS display with mobile phone, customers will have a clear and uncluttered view of the checkstand and its surrounding environs, and cashiers can view the customer and checkout line while scanning and viewing the display. Equipment as compact as this, can be implemented less expensively than the conventional components taken as a group. Advantageously, the cashier can see the transaction items, as well as, the display related to the items at all times since they are always in front of him or her.

According to another aspect of the invention, the shopping experience is heightened by providing a customized customer shopping headset or headheld scanner to customers desiring one or by providing store applications and interfaces for customers having a headset, such as Google Glass™, as addressed further below. In this embodiment, the POS display is replaced by a customer display to display a wide variety of shopping related displays as addressed further below.

A "Virtual Assistant" (VA) will help make shopping fun and easy. As presently embodied, the assistant is in the form of a headheld scanner with an earpiece and microphone attached to it. The virtual assistant may be embodied as software supporting features adapted to improve retail shopping experiences, plus the added features of augmented reality. It is may be implemented as a cloud based system, and has the capability to adapt and learn new interactions with customers. It is further capable of employing voice recognition, as well as, identifying gestures.

A more complete understanding of the present invention, as well as further features and advantages of the invention, will be apparent from the following Detailed Description and the accompanying drawings.

DETAILED DESCRIPTION

Figure 1:
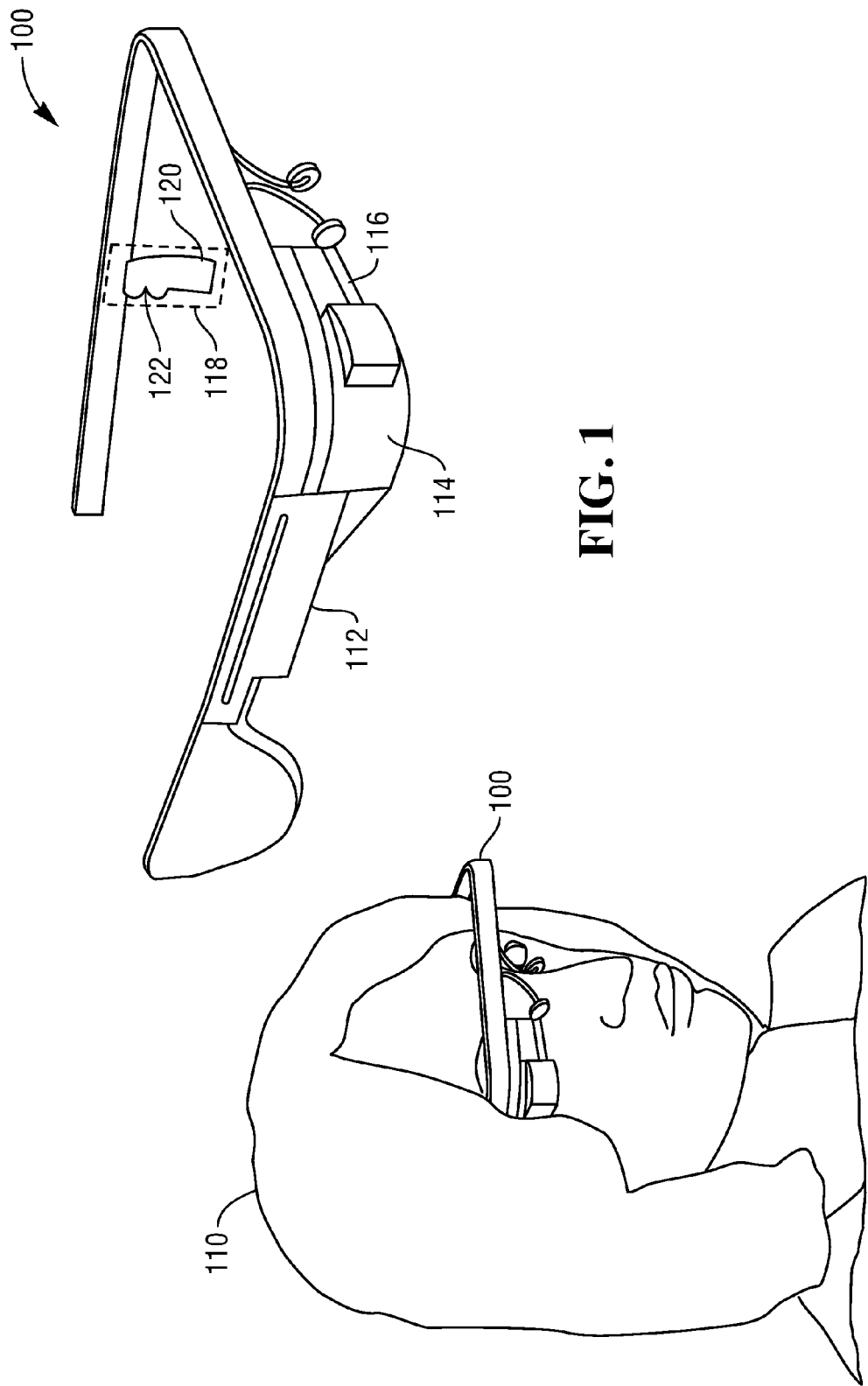
FIG. 1 is a perspective view of a headheld scanner and display with a mobile phone in accordance with either of the embodiments of the present invention.

FIG. 1 shows a perspective view of a headheld scanner and display with mobile phase (headheld scanner) 100 in accordance with either of the two embodiments of the present invention. In a first embodiment, headheld scanner 100 is utilized by a store employee, such as a cashier or checkout clerk, as part of the checkout process in a retail, grocery or other store, and the display is at least partly a point of sale (POS) display displaying checkout transaction details. In a second embodiment, a customer or shopper utilizes the headheld scanner 100 during shopping to enhance the shopping experience as discussed in detail below, and the display is at least partly driven by a virtual assistant software application which displays various store and item details to assist the shopper.

In a left portion of FIG. 1, a user 110, representing either a store employee or a customer, wears the headheld scanner 100 which comprises frame 112 supporting a projector and camera module 114, a display 116, a mobile phone 118, a microphone 120, and a speaker 122. Internal to the frame 112 are additional electronics including a processor and software, as described further below. In one implementation an existing product, such as the Google Glass™ headset, is modified according to the teachings of the present invention to support the additional functions of the present invention.

Various aspects of wearable computers that may suitably be incorporated in the present headheld scanner are described in U.S. Pat. No. 8,203,502 issued Jun. 19, 2012; U.S. Patent Application Publication No. 2013/0002545 published Jan. 3, 2013; U.S. Patent Application Publication No. 2013/0002724 published Jan. 3, 2013; U.S. Patent Application Publication No. 2013/0007672 published Jan. 3, 2013; U.S. Patent Application Publication No. 2013/0016070 published Jan. 17, 2013; U.S. Patent Application Publication No. 2013/0021269 published Jan. 24, 2013; U.S. Patent Application Publication No. 2013/0021374 published Jan. 24, 2013; U.S. Patent Application Publication No. 2013/0027572 published Jan. 31, 2013; and U.S. Patent Application Publication No. 2013/0044042 published Feb. 21, 2013, for example, all of which are assigned to Google, Inc. and incorporated by reference herein in their entirety. The aspects of the above described wearable computers would be augmented as discussed herein to support cashiers in performing checkout functions or to aid shoppers in their shopping.

Alternatively, a headheld scanner according to the present invention can be specifically designed to implement the aspects of the present invention addressed herein. One device might be utilized to support both embodiments or two customized devices might be employed. Further, customers having their own wearable computers might download an application from a store they want to shop at while customers not owning such a device might utilize a device borrowed from the store for the time they spend shopping.

Figure 2:
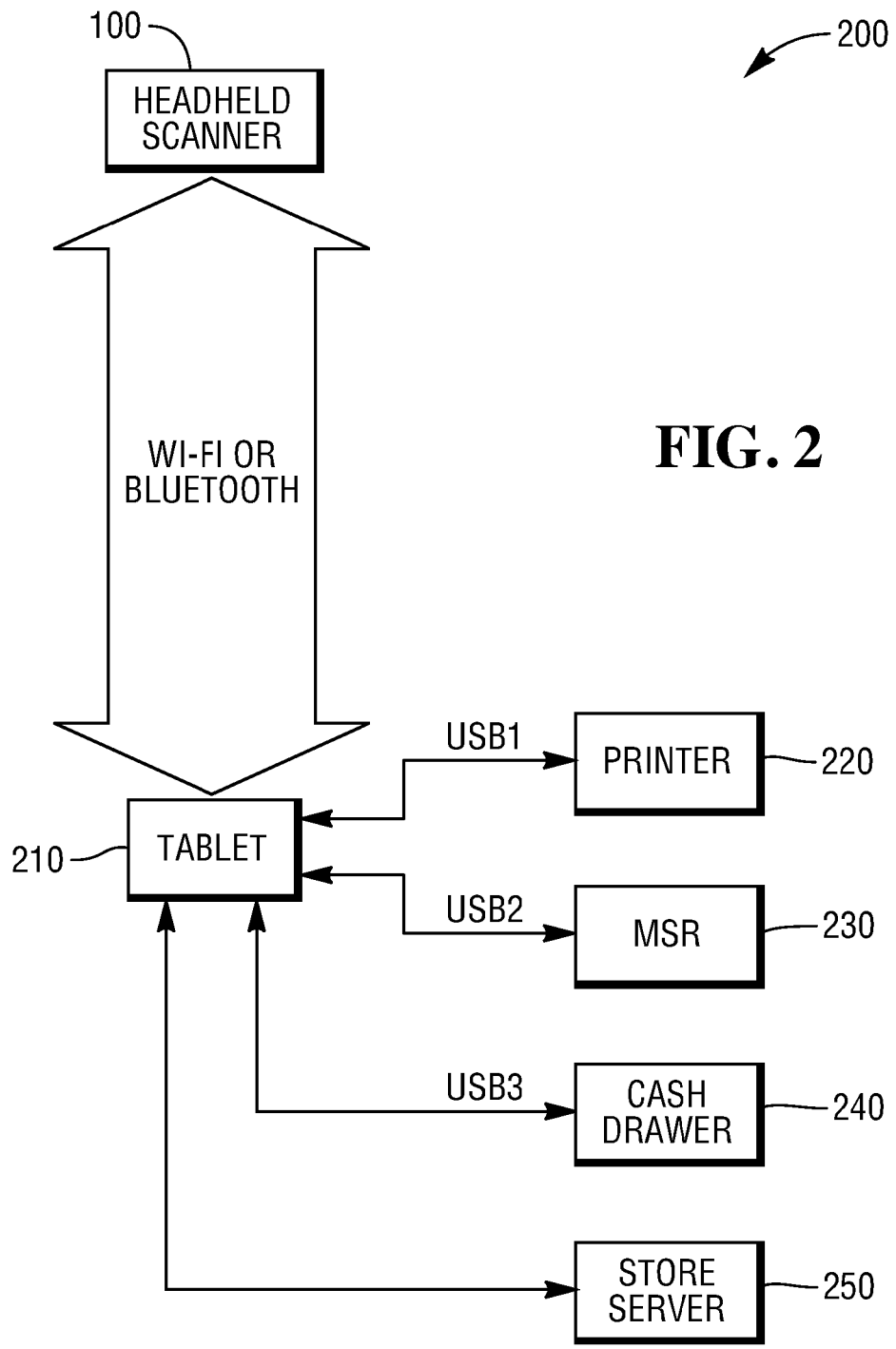
FIG. 2 shows a block diagram of a system in accordance with either of the embodiments the present invention.

FIG. 2 shows a block diagram of a system 200 incorporating the headheld scanner 100 of FIG. 1 in accordance with the present invention. The headheld scanner 100 communicates utilizing Wi-Fi®, Bluetooth® or another acceptable communication mechanism with a tablet device 210 which is connected by first, second and third USB connectors, USB1, USB2, and USB3, respectively, to a printer 220 for printing customer receipts, coupons, and the like, magnetic stripe reader (MSR) 230 for reading credit cards, customer loyalty cards, and the like, and cash drawer 240 for depositing cash payments and making change, respectively, which operate together as discussed further below. In addition, the tablet device 210 is shown connected through the tablet device 210 to a store server 250. Alternatively or additionally, the headheld scanner 100 may communicate directly with the store server 250 with a Wi-Fi® or other wireless connection.

Figure 3:
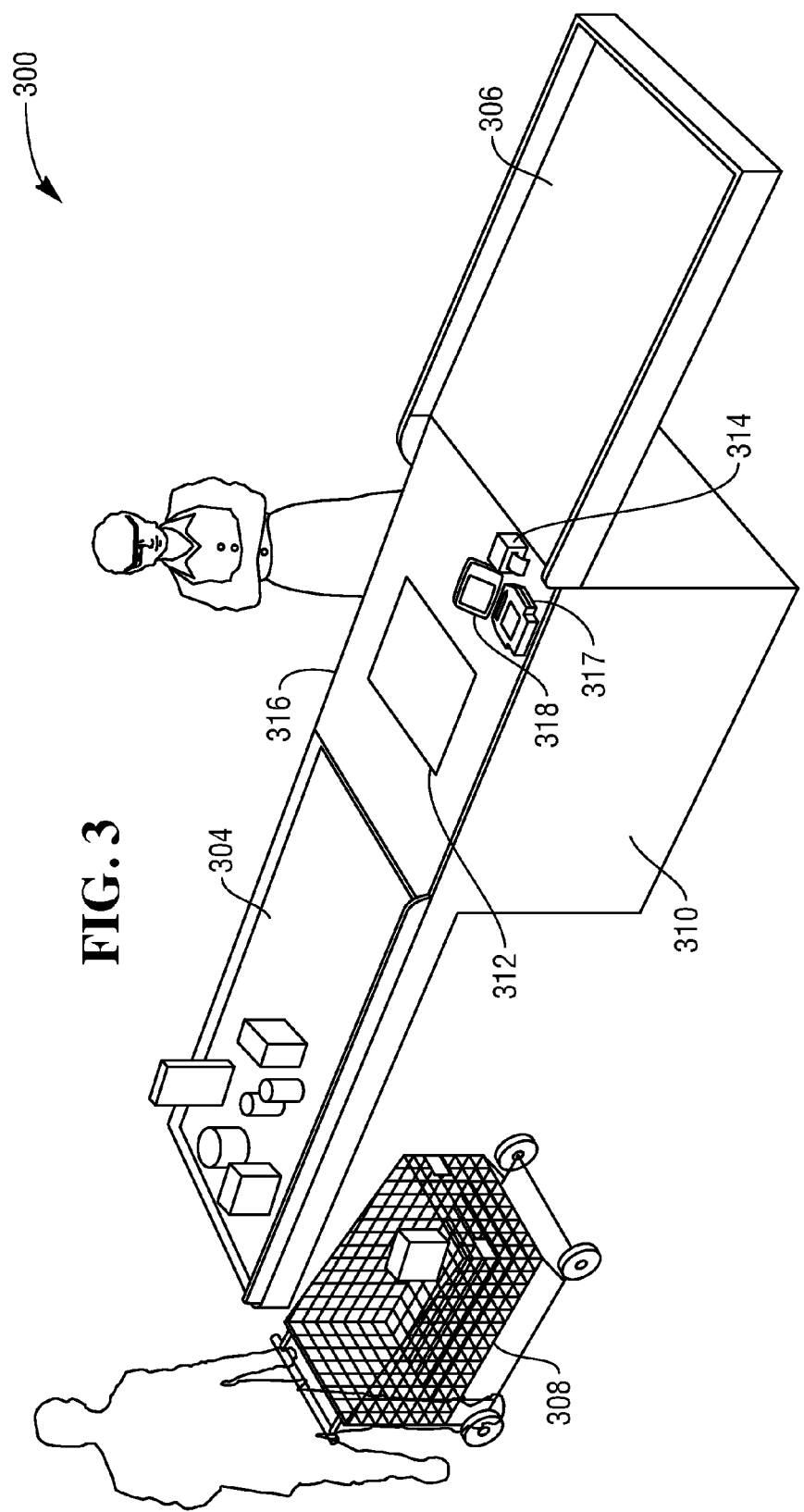
FIG. 3 illustrates aspects of a first embodiment in which the invention is utilized by a store cashier during checkout.

FIG. 3 shows an illustration of a checkout system 300 in which a cashier wears the headheld scanner 100 at a checkstand 310 having a conveyor 304 and a bagging area 306. A customer transfers items from a basket 308 to the conveyor 304 which advances them to a point where they can be easily reached by the cashier. The cashier can then simply scan the barcode of each item by focusing the camera of the projector and camera module 114 on the barcode. The projector may be programmed to project an aiming beam to help the cashier focus quickly on the barcode. Additionally, the camera provides an image of what the cashier is looking at on the display 116 which may also be programmed to provide a focus aid, such as a box, a crosshair, or the like. While it will be recognized actual layouts of such systems chosen by stores will vary depending upon their requirements, it is noteworthy how open and uncluttered checkout system 300 appears.

Barcode data is transmitted from the headheld scanner to the store price look-up database in store server 250 which retrieves a price for the item which may be displayed on the tablet 210 so the customer can confirm a correct price, as well as, on the display 116 of the headheld scanner 100.

Items to be weighed are weighed on a scale 312 which may be built into the checkstand 310. Upon completion of a transaction a customer receipt is printed by receipt printer 314. A cash payment is deposited in cash drawer 316 and change is provided therefrom, or a card payment is made by swiping a credit card or the like in magnetic stripe reader 316. A customer signature may be made upon and stored with a tablet device 318.

Figure 4:
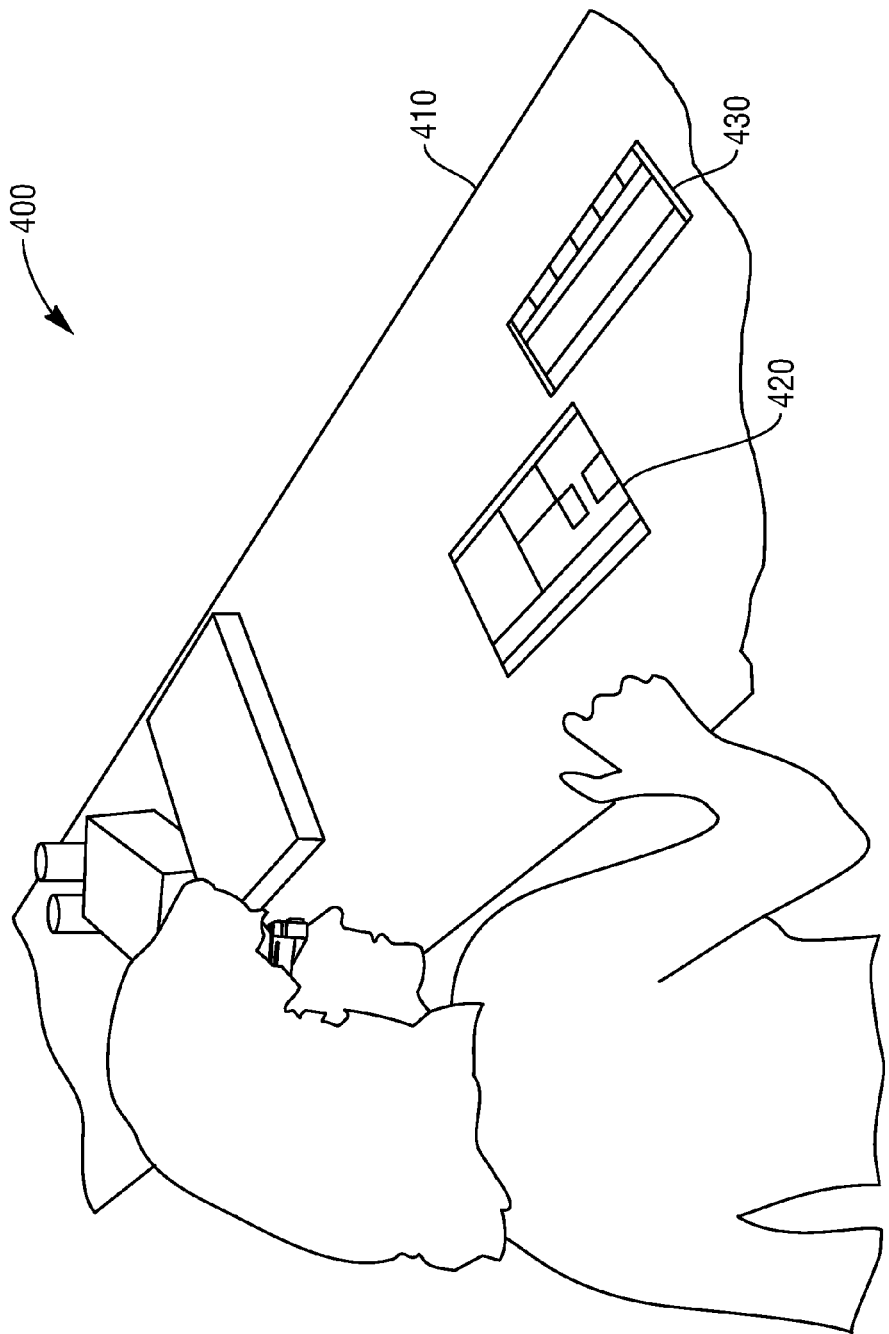
FIG. 4 illustrates further aspects of the first embodiment of the invention.

FIG. 4 illustrates further aspects of an embodiment of the projector and camera module 114. As seen in system 400 of FIG. 4, the cashier wears the headheld scanner 100. In addition to speaking commands picked up by microphone 120 and analyzed using voice recognition software, the cashier can make gestures or other movements which are detected and recognized by analyzing images from the camera of the projector and camera module 114. The suitably programmed processor of the headheld scanner 100 can recognize the gesture or motion as a command to activate a virtual peripheral, such as a keyboard 420, scale display 430 or the like. These virtual peripherals can be projected by the projector of the projector and camera module 114 onto a top surface of checkstand 410 as seen in FIG. 4. Either the cashier or the customer can interact with a peripheral as desired. For example, a cashier can key in barcode data for a damaged barcode or enter a code for a produce item, or the like, using projected keyboard 420. Alternatively, a customer can enter name and address information to sign up for a customer loyalty program, can enter a personal identification number (PIN), or the like.

Figure 5:
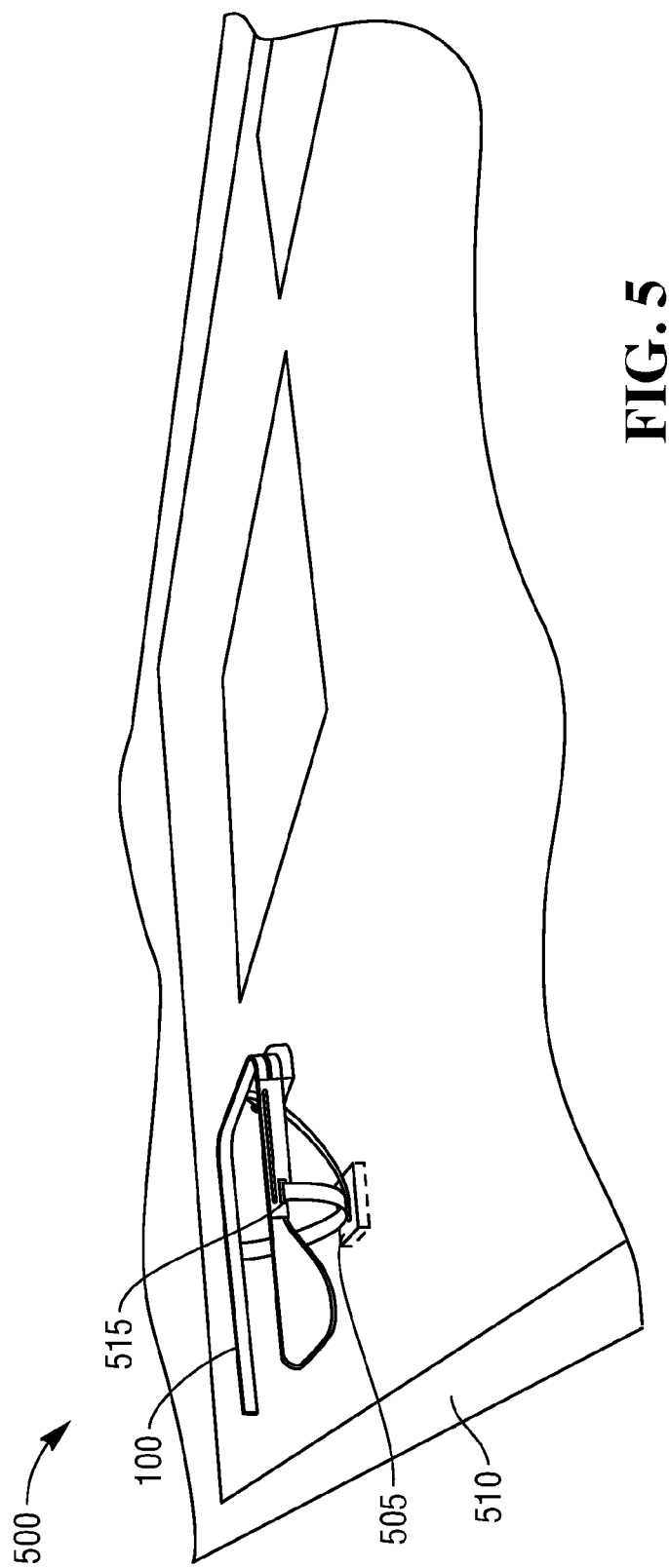
FIG. 5 illustrates a docking arrangement for the headheld scanner of the first embodiment.

FIG. 5 illustrates a docking arrangement 500 in which the headheld scanner 100 is docked in a mount 505 built into checkstand 510 for charging and data transfer. The top surface of the mount is preferably flush with the top surface of checkstand 510 with wiring under the checkstand. A USB micro-B connector 515 may suitably be employed for charging. In the charging mode, items can still be presented to the camera of the projector and camera module 114 for image based scanning so that scanning can continue during charging. Alternatively, a cashier may prefer this mode of operation or may simply need a break from wearing the headheld scanner 100 if his or her neck or eyes become tired from usage in connection with the headheld scanner 100, or simply to vary the routine.

Figure 6:
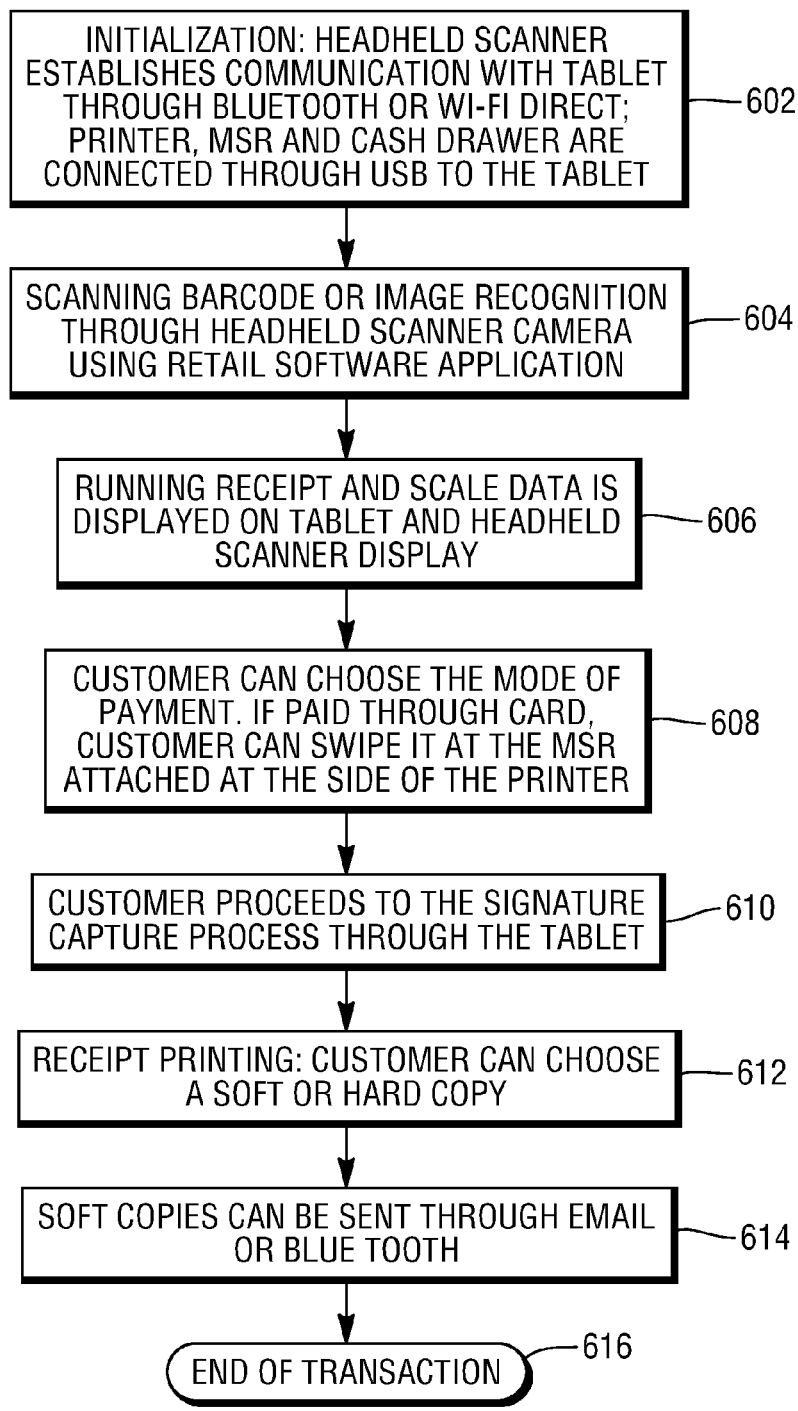
FIG. 6 illustrates a transaction process utilizing the headheld scanner of the first embodiment.

FIG. 6 illustrates a transaction process 600 of utilizing a headheld scanner configured for cashier usage. In step 602, a headheld scanner, such as headheld scanner 100 of FIG. 1, initializes communication with the store checkout system, for example by establishing a direct communication link with a tablet, such as the tablet 210 of FIG. 2 utilizing Bluetooth® or Wi-Fi®. Communication is indirectly established through the tablet 210 with other checkout components, such as, the printer 220, magnetic stripe reader 230 and cash drawer 240 connected to the tablet 210 by USB connections. Communication with the store server 250 may be direct or indirect.

In step 604, items to be purchased by a customer are scanned by the cashier using an image scanner, such as the camera of headheld scanner 100 or alternatively by employing image recognition, either of which is supported by a retail application software downloaded to a Google Glass™ unit or included as part of a custom headheld scanner. The retail application software also formats the data in a manner suitable for communication to a store server, such as store server 250 to perform price look-up for the item, access applicable discount, tax data, and the like.

In step 606, running receipt and scale data is computed and displayed, for example, on display 116 of headheld scanner 100 and the display of tablet 210, for review by the customer.

In step 608, a customer can choose the mode of payment. If paid through a card, the customer can swipe the card using a magnetic stripe reader, such as MSR 230, which may suitably be attached at the side of the printer 220. Alternatively, cash may be passed to the cashier who deposits the cash in a cash drawer, such as the cash drawer 240, and provides change therefrom as needed. The cash drawer 240 will typically be locked shut until driven to open by a signal from a POS application, such as the POS application of the headheld scanner 100.

In step 610, to finish a card payment where signature is required, the customer utilizes a tablet, such as tablet 210, to capture his or her signatures. With respect to receipt printing, in step 612, the customer can choose a soft or hard based copy of the receipt using the tablet 210. A hard copy is printed using a printer, such as printer 220, and a soft copy can be sent in step 614 through email or utilizing Bluetooth® or the like to send the soft copy to the customer's phone, pad or other suitable customer device. In step 616, the transaction ends and the cashier can serve the next customer with the process 600 looping back to step 604.

Additionally, a mobile phone, such as the microphone 120 and the speaker 122 of the phone 118 are supported by voice recognition. The phone 118 also allows the cashier to coordinate with other cashiers and a supervisor or supervisors. Alternatively, Bluetooth® or Wi-Fi® may be employed to the same ends.

Figure 7:
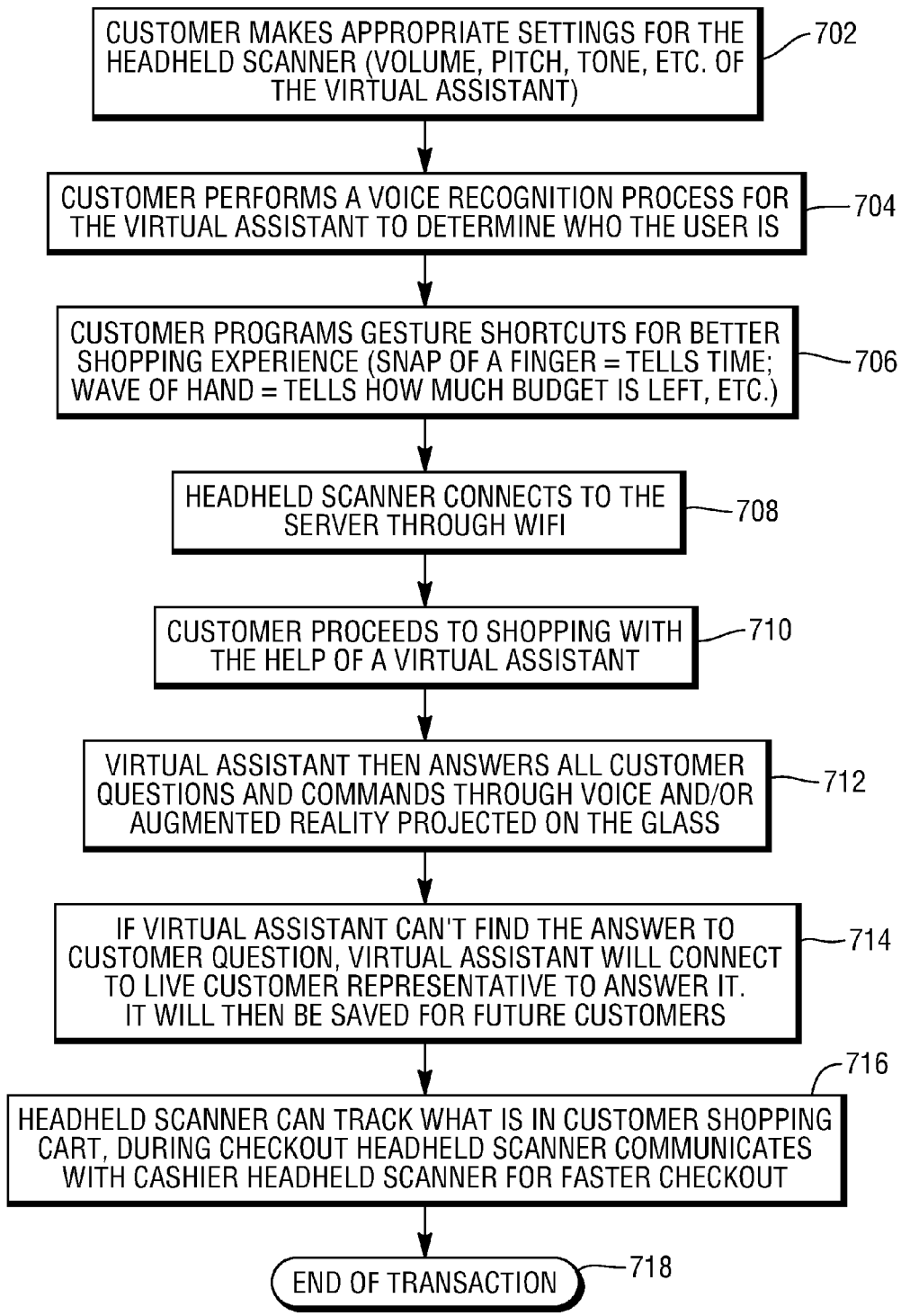
FIG. 7 illustrates a customer use process of the headheld scanner in accordance with a second embodiment of the present invention.

Turning to FIG. 7, this figure shows a process 700 for customers to use a headheld scanner, such as the headheld scanner 100 adapted for customer use. In this process 700, the invention seeks to help customers have a better retail shopping experience.

To this end, a virtual grocery or retail assistant (VA) is implemented as software executed by a headheld scanner and supported by a store server with its software and data storage making the headheld scanner capable of providing an augmented reality experience to the customer.

Display 116, microphone 120, and speaker 122 are utilized to interact with the customer. The VA is like Siri™ of the iPhone™, but with the many added capabilities, such as the capability of showing customers shopping and store related information through a visual, augmented reality. As such, it can replace or reduce the burden on human grocery personnel that you can ask anything, such as a price, a location, a store policy, or the like. The VA can also act as a communication device with other headheld scanners. For example, if someone wants to talk to a friend at the same store. The VA can also track what is put in one's cart which can make a faster checkout. Also, it's able to determine gestures.

The VA will do and answer anything a customer asks and respond to commands. For example, a price request will be responded to with a voice response, as well as, with an augmented reality projection on the display with the price of an item, information about the item, such as nutritional information, or other information can also be provided. Product comparisons may be provided depending on what category of information is wanted, such as price, weight, calories, and the like.

The display may show what is on sale, as well as, showing store maps. The VA can guide a customer to where an item is then emphasize its specific location through an augmented reality display. A customer having a grocery list may load it to the VA which then provides alerts when the customer is near those items. The VA can also make a budget limit for a shopper. The VA can display an advertisement for a product on one's list, a product regularly purchased, or a product being promoted by the store. The VA can answer which is the shortest and fastest lane for checkout. The time and weather may be shown, and reminders may be recorded. Customized background music can be provided for an enjoyable grocery experience. Programmable gesture recognition can be supported, such as the snap of a finger tells time; a wave of hand tells how much budget is left; and the like. The voice (man or woman) and tone (high or low), can also be customized. The VA can be used to communicate with other shoppers through their VA. Finally, if the VA does not know the answer, it can connect the shopper to a live customer service representative and adapt and learn the response for use with subsequent customers.

Returning to process 700, in step 702, a customer makes appropriate settings for the headheld scanner, such as volume, pitch, tone, and the like, of the virtual assistant (VA). In step 704, a customer performs a voice recognition process for the VA to determine the user's identity. For example, the user might say "My name is John Smith". In step 706, the customer programs or selects gesture shortcuts for a custom shopping experience. For example, a snap of the fingers may be utilized as a command to tell the time, a wave of the hand may be utilized as a command for the VA to tell how much budget is left, and the like. To this latter end, a customer may use the headheld scanner to read barcodes of items as they are added to the cart, say their names, or they may be visually identified by image recognition from image recognition provided by the camera of the headheld scanner.

In step 708, the headheld scanner connects to the server through a Wi-Fi® conncetion. In step 710, the customer begins to shop with the help of the VA. In step 712, the VA answers all customer questions and responds to all commands, such as the example commonly addressed above through voice response utilizing a speaker, such as speakers in mobile phone 118 and augmented reality displays projected on the display 116.

In step 714, in the event the VA cannot find the answer to a customer question, the VA will connect to a live customer representative to answer it. The customer question and live representative answer will be saved for use and analysis by the VA to learn from in responding to future customers.

In step 716, the customer headheld scanner is employed to track what is in the customer's shopping cart and communicates with a standard checkout system or a cashier headheld scanner to speed checkout. In step 718, the transaction ends.

Figure 8:
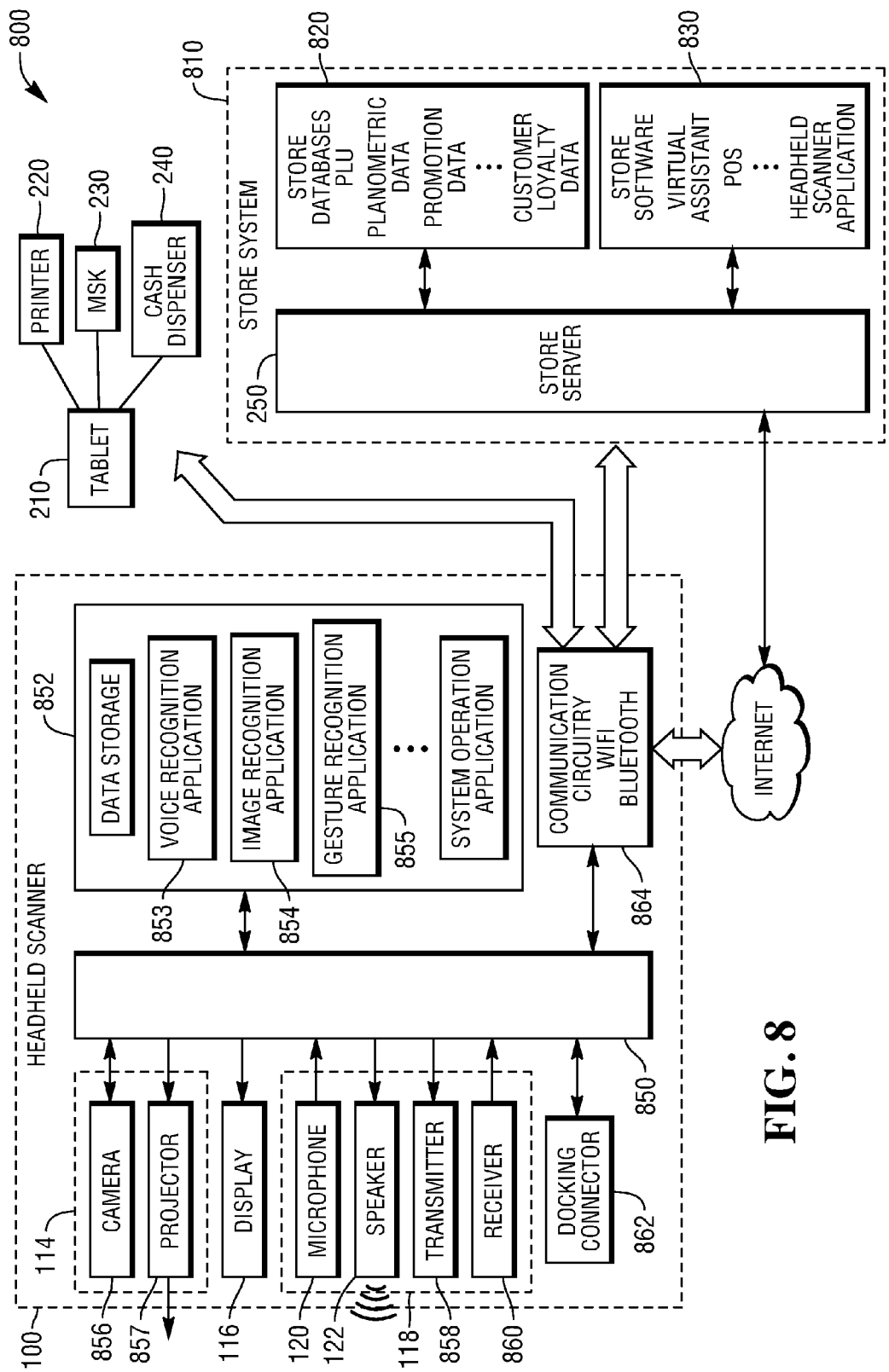
FIG. 8 illustrates a block diagram of a store system integrating the headheld scanner of FIG. 1.

FIG. 8 illustrates a system 800 incorporating one or more headheld scanners 100. While a single headheld scanner 100 is shown in FIG. 8 for ease of illustration, in a typical store environment, it is anticipated that a number of cashiers and customers will be employing headheld scanners 100. Each headheld scanner 100 employed by a cashier will preferably communicate with a tablet 210, as well as, with a store server 250. The store server 250 is part of a store system 810 which may suitably include any existing store databases and software in a store database 820 in addition including a price lookup (PLU) database, planometric and store map data, promotion data, and customer loyalty data, all of which are accessible to the headheld scanner 100 as needed to implement the present invention; and store software 830 including VA software, POS software and headheld scanner application software which may be downloadable to an existing Google Glass™ or other wearable heads-up display unit utilizing Internet access to a website hosted by the store server 250.

In the example, headheld scanner 100, a programmed processor 850 has memory 852 storing data and system operating software, as well as, application software such as a voice recognition application 853, an image recognition application 854, and a gesture and motion recognition application 855, for example. Processor 850 provides control signals to camera 856 and projector 857 of projector and camera module 114. Processor 850 also receives image data from camera 856 which is processed to decode a barcode or perform product recognition in connection with a price lookup at checkout. Processor 850 also drives display 116 to provide cashier or customer displays as addressed further above. Processor 850 receives inputs from microphone 120 and drives speaker 122 of mobile phone 118 which also includes wireless transmitter 858 and receiver 860. Processor 850 is also capable of providing outputs and receiving inputs from docking connector 862 when utilized in a docking mode for charging, fixed image scanning, or the like. Wi-Fi® or Bluetooth® communication circuitry 864 is controlled by processor 850 to communicate with tablet 210, store server 250 or other devices in sufficient proximity.

In addition to the illustrative circuitry and software, it will be recognized additional circuitry and software may be employed. For example, circuitry and software such as that of FIG. 9 of U.S. Pat. No. 8,203,502 and described at col. 13, line 45-col. 15, line 37 is specifically incorporated by reference herein, but is not shown so as not to obscure the invention.

While the present invention has been disclosed in the context of various aspects of presently preferred embodiments, it will be recognized that the invention may be suitably applied to other environments consistent with the claims which follow and subsequent advances in the field. For example, while the bulk of the discussion above is in the context of checkout stands suited to large grocery and retail stores, it will be recognized that the concepts can be applied to checkout systems more generally where a bulky point of sale terminal and scanner are employed. Additionally, while cashier operated headheld scanners are described herein in conjunction with tablets, it will be recognized that headheld scanners could readily communicate with other pre-existing POS equipment to retrofit with existing equipment.

We claim:

1. A wearable headheld scanner comprising:
a camera for capturing an image of a product;
a display;
a projector;
wireless communication circuitry;
a programmed processor for processing the image to look up and retrieve product related data from a store server, for displaying the product related data to a wearer of wearable headheld scanner using the display, for projecting virtual peripherals associated with a transaction on a checkstand surface using the projector, the virtual peripherals for interaction with during the transaction and completing the transaction through the wireless communication circuitry, wherein the wireless communication circuitry in wireless communication with a computer, and the computer is a tablet computer having at least one Universal Serial Bus (BUS) to a cash drawer represented by one of the virtual peripherals.

2. The wearable headheld scanner of claim 1 further comprising:
a frame integrating the camera, the display, the projector, and the programmed processor in a product shaped and worn like a pair of eyeglasses, wherein the display is in front of an eye of the wearer like an eyeglass lens.

3. The wearable headheld scanner of claim 1 wherein said image a barcode, and the programmed processor decodes the barcode from said image to provide decoded barcode data and transmits the decoded bar code data utilizing the communications circuitry for purposes of a price look-up for the product.

4. The wearable headheld scanner of claim 1 further comprising:
a mobile phone integrated therein.

5. The wearable headheld scanner of claim 3 wherein the communication circuitry comprises Wi-Fi® or Bluetooth® communication circuitry which interfaces with the tablet computer to control a receipt printer and interface with a magnetic stripe reader.

6. The wearable headheld scanner of claim 1 further comprising:
a virtual assistant software application supporting retrieval of product information from a store server system.

7. The wearable headheld scanner of claim 6 wherein the product information comprises product price and product location.

8. The wearable headheld scanner of claim 1 wherein the projector also projects a virtual keyboard on the checkstand surface.

9. The wearable headheld scanner of claim 8 wherein customer and cashier use of the virtual keyboard is detected utilizing the camera.

10. The wearable headheld scanner of claim 1 wherein the wearer is a cashier and the product related data comprises a price displayed to the cashier as part of a checkout transaction receipt.

11. The wearable headheld scanner of claim 1 further comprising a projector to project a virtual display on a checkstand surface for controlling a scale in the checkstand.

12. A method of checkout comprising:
capturing an image of a product by a camera integrated in a wearable headheld scanner;
processing the image utilizing a programmed processor integrated in a wearable headheld scanner to look up and retrieve product related data from a store server;
displaying the product related data to a wearer of the wearable headheld scanner by a display integrated in the wearable headheld scanner;
projecting virtual peripherals associated with a transaction on a checkstand surface by a projector integrated in a wearable headheld scanner, wherein the virtual peripherals for interaction with during the transaction, wherein projecting further includes projecting at least one virtual peripheral as a cash drawer;
recording wearer selection of a method of payment;
controlling by the programmed processor, through wireless communication circuitry integrated in the wearable headheld scanner, a payment device coupled to a computer at the checkstand to complete the payment, wherein the computer having at least one Universal Serial Bus connection to the cash drawer, and wherein the computer is a tablet computer.

13. The method of claim 12 wherein a frame integrates the camera, the display, the projector, the communications circuitry, and the programmed processor in a product shaped and worn like a pair of eyeglasses, and wherein the display is in front of an eye of the wearer like an eyeglass lens, the method further comprising:
   decoding a barcode from said image data to provide decoded barcode data; and
   transmitting the decoded bar code data utilizing the communications circuitry for purposes of a price lookup for the product, wherein the communications circuitry is part of a mobile phone integrated within the wearable headheld scanner.

14. The method of claim 13 wherein the communication circuitry further comprises Wi-Fi® or Bluetooth® communication circuitry and the method further comprises:
   interfacing with the tablet computer to control a receipt printer and interface with a magnetic stripe reader.

15. The method of claim 12 further comprising:
   utilizing a virtual assistant software application to retrieve product information from a store server system.

16. The method of claim 15 wherein the product information comprises product price and product location.

17. The method of claim 12 further comprising:
   projecting a virtual keyboard on a checkstand surface utilizing projector.

18. The method of claim 17 further comprising:
   detecting customer and cashier use of the virtual keyboard utilizing the camera.

19. The method of claim 12 further comprising:
   projecting a virtual display on a checkstand surface for controlling a scale in the checkstand utilizing a projector integrated into the wearable headheld scanner.

20. One or more of non-transitive digital storage media software instruction sequences which when executed by one or more computing devices cause performance of a method of checkout as follows:
   capturing an image of a product by a camera integrated in a wearable headheld scanner;
   processing the image to look up and retrieve product related data from a store server;
   displaying the product related data to a wearer of the wearable headheld scanner by a display integrated in the wearable headheld scanner;
   projecting virtual peripherals associated with a transaction on a checkstand surface by a projector integrated in a wearable headheld scanner, wherein the virtual peripherals for interaction with during the transaction, wherein projecting further includes projecting at least one virtual peripheral as a cash drawer;
   recording wearer selection of a method of payment; and
   controlling by the programmed processor, through wireless communication circuitry integrated in the wearable headheld scanner, a payment device coupled to a computer at the checkstand to complete the payment, wherein the computer has at least one Universal Serial Bus connection to the cash drawer.

* * * * *